(12) United States Patent
Devi et al.

(10) Patent No.: US 10,967,365 B2
(45) Date of Patent: Apr. 6, 2021

(54) FUNCTIONALIZED ZINC OXIDE NANOPARTICLES FOR PHOTOCATALYTIC WATER SPLITTING

(71) Applicant: Council of Scientific & Industrial Research, New Delhi (IN)

(72) Inventors: Radhamonyamma Nandini Devi, Pune (IN); Leena George, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 16/890,588

(22) Filed: Jun. 2, 2020

(65) Prior Publication Data
US 2020/0290033 A1 Sep. 17, 2020

Related U.S. Application Data

(62) Division of application No. 15/105,231, filed as application No. PCT/IN2014/000780 on Dec. 16, 2014, now Pat. No. 10,717,072.

(30) Foreign Application Priority Data

Dec. 16, 2013 (IN) .......................... 3666/DEL/2013

(51) Int. Cl.
*B01J 31/26* (2006.01)
*B01J 23/06* (2006.01)
(Continued)

(52) U.S. Cl.
CPC .............. *B01J 31/26* (2013.01); *B01J 23/06* (2013.01); *B01J 23/42* (2013.01); *B01J 23/60* (2013.01); *B01J 23/66* (2013.01); *B01J 23/80* (2013.01); *B01J 31/0209* (2013.01); *B01J 31/0215* (2013.01); *B01J 31/0229* (2013.01); *B01J 31/0271* (2013.01); *B01J 31/06* (2013.01); *B01J 35/004* (2013.01); *B01J 35/0006* (2013.01); *B01J 35/0013* (2013.01); *B01J 37/0203* (2013.01); *B01J 37/031* (2013.01);
(Continued)

(58) Field of Classification Search
None
See application file for complete search history.

(56) References Cited

U.S. PATENT DOCUMENTS

| | | | |
|---|---|---|---|
| 5,916,947 A | 6/1999 | Morris et al. | |
| 7,338,590 B1 | 3/2008 | Shelnutt et al. | |

(Continued)

FOREIGN PATENT DOCUMENTS

| | | | |
|---|---|---|---|
| JP | 2007054692 A | | 3/2007 |
| JP | 2008222605 A | * | 9/2008 |

OTHER PUBLICATIONS

JP-2008222605-A-english translation (Year: 2008).*

(Continued)

*Primary Examiner* — Stefanie J Cohen
(74) *Attorney, Agent, or Firm* — Dinsmore & Shohl LLP

(57) ABSTRACT

The present invention relates to a photocatalyst composition having visible light activity for hydrogen production through water splitting. More particularly, the present invention discloses a photocatalyst composition comprising a zinc oxide nanoparticles and a conjugated organic moiety selected from the group consisting of oligothiophenes, azo dyes, and perylenes.

4 Claims, 6 Drawing Sheets

(51) Int. Cl.
*B01J 35/00* (2006.01)
*C01B 3/04* (2006.01)
*B01J 37/03* (2006.01)
*B01J 37/02* (2006.01)
*B01J 23/60* (2006.01)
*B01J 23/66* (2006.01)
*B01J 23/80* (2006.01)
*B01J 31/06* (2006.01)
*B01J 23/42* (2006.01)
*B01J 31/02* (2006.01)
*B01J 37/04* (2006.01)
*B01J 37/10* (2006.01)
*C01G 9/02* (2006.01)

(52) U.S. Cl.
CPC .......... B01J 37/036 (2013.01); B01J 37/04 (2013.01); B01J 37/10 (2013.01); C01B 3/042 (2013.01); *B01J 2231/005* (2013.01); *B01J 2531/005* (2013.01); *B01J 2531/007* (2013.01); *C01G 9/02* (2013.01); *C01P 2002/84* (2013.01); *C01P 2004/04* (2013.01); *C01P 2004/64* (2013.01); *Y02E 60/36* (2013.01)

(56) References Cited

U.S. PATENT DOCUMENTS

| | | |
|---|---|---|
| 8,366,974 B2 | 2/2013 | Stupp et al. |
| 2002/0061330 A1 | 5/2002 | Chowdhary et al. |
| 2007/0161504 A1 | 7/2007 | Ohno et al. |
| 2010/0179301 A1 | 7/2010 | Henninger et al. |
| 2010/0184887 A1* | 7/2010 | Gonzalez ............ B82Y 30/00 524/99 |
| 2011/0236284 A1* | 9/2011 | Hayakawa .......... C09D 5/1618 423/239.1 |
| 2012/0097068 A1 | 4/2012 | Riggs et al. |
| 2012/0145532 A1 | 7/2012 | Smolyakov et al. |
| 2012/0178619 A1 | 7/2012 | Ji et al. |
| 2012/0267240 A1 | 10/2012 | Ke et al. |
| 2014/0174905 A1* | 6/2014 | Landry ............... B01J 35/004 204/157.5 |

OTHER PUBLICATIONS

Dhanalakshmi KB et al., "Dye sensitized hydrogen evolution from water," International Journal of Hydrogen Energy, Slsevier Science Publishers B.V., Jul. 1, 2001, vol. 26, No. 7, pp. 669-674, Barking, Great Brittan.

Belhadi A et al. "Photoassisted hydrogen production under visible light over NiOIZnO hetero-system," Applied Energy, Slsevier Science Publishers, May 22, 2011, vol. 88, No. 12, pp. 4490-4495, Great Brittan.

Wang Zhifeng et al., "Polypyrrole sensitized ZnO nanorod arrays for efficient photo- electrochemical splitting of water," physica B. Condensed Matter, Mar. 28, 2013, vol. 419, pp. 51-56, Amsterdam, Netherlands.

ISA/EPO, International Search Report and Written Opinion prepared for PCT/IN2014I000780, dated May 15, 2015.

ISA/EPO, International Preliminary Report on Patentability prepared for PCT/IN2014/000780, dated Feb. 26, 2016.

Liu, FS et al. Hydrogen production from water splitting using perylene dye-sensitized Pt/Ti02 photocatalyst.

Perez-Larios A et al. Improved hydrogen production from water splitting using Ti02-Zn0 mixed oxides photocatalysts.

Jui et al, Novel blue-light-emitting hybrid materials based on oligothiophene acids and ZnO, chemical physics letters, 398, 113-117 (Year: 2004).

JP-2007054692-A, English translation (Year: 2007).

Kagan et al, 2,2':5',2',-Terthiophene-5-carboxylic Acid and 2,2':5',2"-Terthiophene-5,5"-dicarboxylic Acid, journal of org chem, 48, 4076-4078 (Year: 1983).

Marczak et al, "Communication via Electron and Energy Transfer between Zinc Oxide Nanoparticles and Organic Adsorbates," J. Phys. Chem. 2009 113, pp. 4669-4678 (Year: 2009).

* cited by examiner (a)

(b)

(c)

(a)

(b)

(a)

(b)

(a)

(b)

FUNCTIONALIZED ZINC OXIDE NANOPARTICLES FOR PHOTOCATALYTIC WATER SPLITTING

CROSS REFERENCE TO RELATED APPLICATIONS

This application is a divisional of U.S. application Ser. No. 15/105,231, filed Jun. 16, 2016, now U.S. Pat. No. 10,717,072, which is a 35 U.S.C. 371 national stage filing and claims priority to International Application No. PCT/IN2014/000780 filed on Dec. 16, 2014, entitled "FUNCTIONALIZED ZINC OXIDE NANOPARTICLES FOR PHOTOCATALYTIC WATER SPLITTING," which claims the benefit of Indian Patent Application No. 3666/DEL/2013 filed on Dec. 16, 2013, each of which is incorporated herein in its entirety by reference.

FIELD OF THE INVENTION

The present invention relates to functionalized zinc oxide (ZnO) nanostructures in photocatalytic water splitting. Particularly, the present invention relates to a photocatalyst composition comprising a zinc oxide nanoparticles (ZnONP) and a conjugated organic moiety wherein the composition can photocatalytically split the water in visible light to obtain hydrogen.

BACKGROUND OF THE INVENTION

The efficient conversion of solar energy into chemical fuels has great economic and environmental significance. Visible light water splitting is a long-standing problem in photochemistry. Efficient photocatalytic water-splitting systems could have practical value for solar energy conversion, particularly if they could be coupled to higher temperature catalytic reactions for making liquid fuels. There remains a long-standing significant research interest in PEC water splitting using zinc oxide (ZnO)-based materials.

Hydrogen generation by photocatalytic water splitting using solar radiation is a renewable process, which can be carried out under ambient conditions for clean energy production. Several semiconductor oxides, sulfides and selenides have been explored which has led to various exciting and attractive developments in solar hydrogen producing system. However, attention is focused on oxide systems due to the availability, ease of synthesis and limited photocorrosion. Among these, zinc oxide has been garnering increasing interest due to its high electron mobility, high thermal conductivity, wide and direct band gap and large exciton binding energy. Moreover, ZnO is a chemically stable and environmentally friendly material.

Zinc oxide semiconductors are well known for their photocatalytic activity which originates from the utilization of photogenerated charges. When light of appropriate energy falls on a semiconductor, electrons are excited from valence band to the conduction band creating a hole in the latter. These charges can be effectively used in a variety of electron transfer or redox reactions provided that they do not recombine wasting the energy. In the case of a semiconductor bulk material, recombination sites are various, ranging from grain boundaries and bulk crystal defects to surface sites. In bigger particles, charges generated in the bulk encounter more number of recombination sites before reaching the surface for utilization in any reaction.

U.S. Pat. No. 7,338,590 discloses a method for generating hydrogen by photocatalytic decomposition of water using porphyrin nanotube composites. In some embodiments, both hydrogen and oxygen are generated by photocatalytic decomposition of water.

US patent application No. US20120145532 discloses a method to directly obtain clean hydrogen from solar radiation by using hybrid nanoparticles with metallic cores and semiconductor photocatalytic shells. Efficient unassisted overall photocatalytic splitting of water is based on resonant absorption from surface plasmon in metal core/semiconductor shell hybrid nanoparticles, which can extend the absorption spectra further towards the visible-near infrared range, thus dramatically increasing the solar energy conversion efficiency. When used in combination with scintillator nanoparticles, the hybrid photocatalytic nanoparticles can be used for conversion of nuclear energy into hydrogen.

Article titled "improved hydrogen production from water splitting using $TiO_2$—ZnO mixed oxides photocatalysts" by A Perez-Larios et al. published in *Fuel*, Volume 100, October 2012, Pages 139-143 reports $TiO_2$—ZnO mixed oxides (1.0, 3.0, 5.0 and 10.0 wt. % Zn) photoconductors were prepared by the sol-gel method and used for the $H_2$ production from water splitting. The solids were characterized by nitrogen physisorption, XRD, RAMAN, EDS, UV-Vis and XPS spectroscopy. High specific surface areas (85-159 $m^2/g$) were obtained in all the mixed oxides compared to the bare $TiO_2$ sample (64 $m^2/g$). XRD and Raman spectra show that anatase is the predominant crystalline phase on the $TiO_2$—ZnO solids. The band gap energy of the solids is in the interval from 3.05 to 3.12 eV which are in the same order than $TiO_2$ (3.2 eV). These solids were proved in the photocatalytic water splitting and resulted six times more active (1300 μmol/h) than the reference $TiO_2$ (190 μmol/h) semiconductor. This coupled $TiO_2$—ZnO mixed oxides improves hydrogen production form water splitting.

Article titled "Hydrogen production from water splitting using perylene dye-sensitized Pt/$TiO_2$ photocatalyst" by FS LIU et al. published in *Acta Phys. Chim. Sin.*, 2007, 23 (12), pp 1899-1904 reports the photocatalyst (DPPBI/Pt/$TiO_2$) was prepared using N,N'-di(4-pyridyl)-3,4,9,10-perylene tetracarboxylic acid bisimide (DPPBI) sensitized Pt/$TiO_2$ and characterized by infrared spectroscopy (IR), UV-Vis diffuse reflectance spectroscopy (UV-Vis DRS), scanning electron microscopy (SEM), X-ray photoelectron spectroscopy (XPS), and X-ray diffraction (XRD). The results of characterization showed that the crystal form of $TiO_2$ was anatase, Pt was highly dispersed on the surface of $TiO_2$ and DPPBI was adsorbed on the surface of Pt/$TiO_2$ in DPPBI/Pt/$TiO_2$. Hydrogen production from water splitting using photocatalyst (DPPBI/Pt/$TiO_2$) was studied.

Therefore, there is need in the art to develop the photocatalytic system which will minimised bulk recombination sites, spatial separation and increase the $H_2$ production in water splitting. Accordingly, the inventors of the present invention developed photocatalytic composition which have the dual advantage of minimised bulk recombination sites using semiconductor nanoparticles and spatial separation and reduced surface sites using conducting organic linkers.

Objectives of the Invention

The main objective of the present invention is to provide functionalized zinc oxide (ZnO) nanostructures in photocatalytic water splitting.

Another object of the present invention is to provide a photocatalyst composition comprising a zinc oxide nanoparticles and a conjugated organic moiety wherein the composition can photocatalytically split the water in visible light to obtain hydrogen.

Another object of the present invention is to provide a photocatalyst composition comprising a zinc oxide nanoparticles and a conjugated organic moiety wherein the composition may optionally contain co-catalyst.

SUMMARY OF THE INVENTION

Accordingly, present invention provides photocatalyst composition comprising a 95-98 wt % zinc oxide nanoparticles and 2-5 wt % a conjugated organic moiety, wherein said photocatalyst composition is having minimized bulk recombination sites, spatial separation and reduced surface sites.

In an embodiment of the present invention, the composition is active in visible light.

In another embodiment of the present invention, the conjugated organic moiety is selected from the group consisting of oligothiophenes, azo dyes, porphyrins, hydroxyquinolones, and perylenes.

In yet another embodiment of the present invention, the composition may optionally contain 1 wt % co-catalyst.

In yet another embodiment of the present invention, co-catalyst is selected from the group consisting of platinum, silver, nickel (II) oxide, and glycerol.

In yet another embodiment of the present invention, the perylenes are selected from the group consisting of 9,10-perylenetetracarboxylic acid, N,N'-Bis (p-carboxyl-phenylene) perylene-3, 4:9,10-perylene bisimide, perylene-3,4,9,10-tetracarboxylic acid, 3,3'-(1,3,8,10-tetraoxo-1,3,8,10-tetrahydroanthra[2,1,9-def:6,5,10-d'e'f']diisoquinoline-2,9-diyl) dibenzoic acid, and 5,5'-(1,3,8,10-tetraoxo-1,3,8,10-tetrahydroanthra[2,1,9-def:6,5,10-d'e'f']diisoquinoline-2,9-diyl) diisophthallic acid.

In yet another embodiment of the present invention, the oligothiophenes are selected from [2,2':5",2"'-terthiophene]-5-carboxylic acid or [2,2':5",2"'-terthiophene]-5-5"-dicarboxylic acid.

In yet another embodiment of the present invention, the azo dye is (E)-4-((2-hydroxynaphthalen-1-yl) diazenyl) benzoic acid.

In yet another embodiment of the present invention, the composition is useful for photocatalytically splitting of water exhibit hydrogen evolution rate is in the range of 5 mmol/g/h to 26 mmol/g/h.

In yet another embodiment, present invention provides a process for the preparation of photo catalyst composition comprises the steps of:
i. refluxing KOH in methanol to obtain a refluxed KOH solution, adding Zn $(OAc)_2 \cdot 2H_2O$ in methanol with stirring at room temperature ranging from 20 to 30° C. to obtain zinc acetate solution;
alternatively, treating zinc acetate dihydrate with ethanol to obtain ethanolic solution of zinc acetate, followed by dissolving oxalic acid dihydrate in ethanol and adding to the ethanolic solution of zinc acetate to obtain a thick gel, followed by drying the thick gel and calcinating said gel to obtain the zinc acetate solution; and
ii. adding 2-5 wt % conjugated organic moiety to zinc acetate solution as obtained in step i with stirring in methanol at room temperature in the range of 20 to 30° C. for period in the range of 1 to 3 h to obtain photocatalyst composition.

Abbreviations Used

4ABBN—(E)-4((2-hydroxynaphthalen-1-yl) diazenyl) benzoic acid
ZnOPP—Zinc oxide nanoparticle prepared by precipitation method
ZnOSG—Zinc oxide nanoparticle prepared by sol-gel method

BRIEF DESCRIPTION OF ACCOMPANYING DRAWINGS

Figure 6:
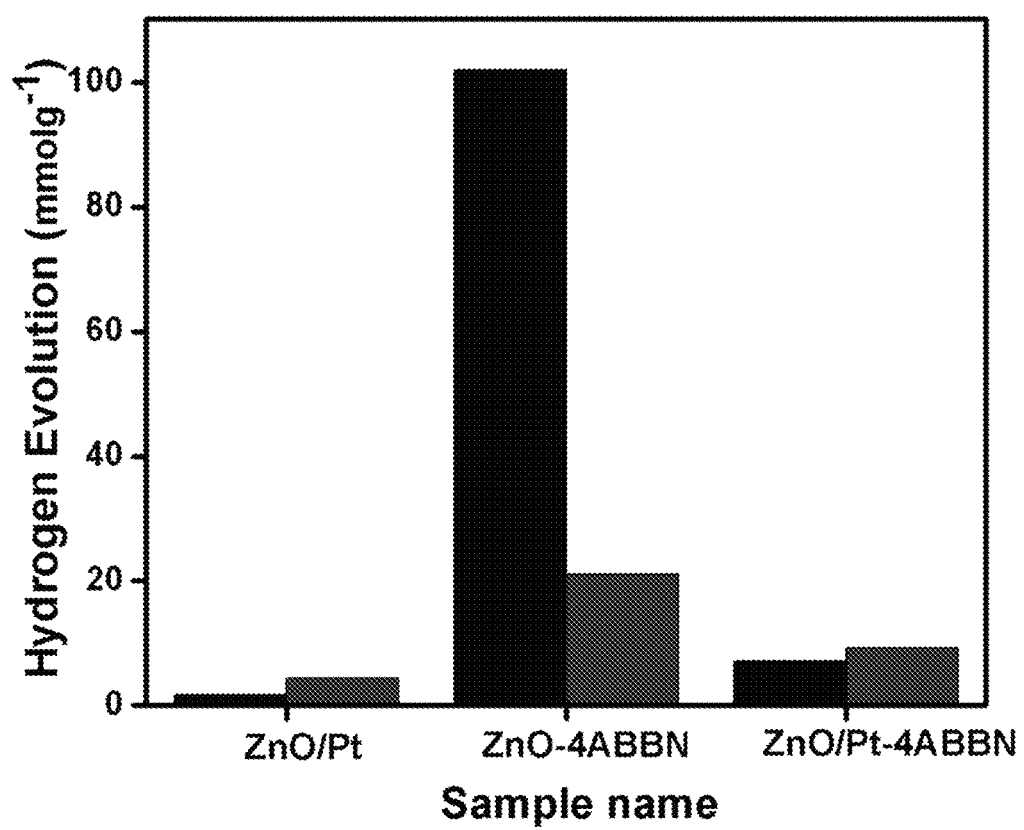

FIG. 6 depicts Hydrogen evolution for 4 h for (left) ZnO/Pt—10+2 nm (black) and 35+15 nm (grey), (middle) ZnO-4ABBN-3.5+1.5 nm (black) and 35+15 nm (grey), (right) Pt/ZnO-4ABBN-3.5+1.5 nm (black) and 35+15 nm (grey).

DETAILED DESCRIPTION OF THE INVENTION

The present invention provides a photocatalyst composition comprising a zinc oxide nanoparticles and a conjugated organic moiety for water splitting in visible light to obtain hydrogen.

In an aspect, the present invention provides a photocatalyst composition comprising a zinc oxide nanoparticles, a conjugated organic moiety and may optionally contain a co-catalyst for water splitting in visible light to obtain hydrogen.

The photocatalyst composition has dual advantage of minimized bulk recombination sites using semiconductor nanoparticles and spatial separation and reduced surface sites using conducting organic linkers.

The present invention provides a photocatalyst composition comprising a zinc oxide nanoparticle, a conjugated organic moiety and may optionally contain a co-catalyst for water splitting in visible light to obtain at least 2 milli moles hydrogen/hour/g of composition.

The present invention provides a composition wherein the conjugated organic moiety is selected from the group consisting of oligothiophenes, azo dyes, porphyrins, hydroxyquinolones, and perylenes.

The photocatalyst composition containing perylenes as conjugated organic moiety are selected from the group consisting of 9,10-perylenetetracarboxylic acid, N,N'-Bis (p-carboxyl-phenelyne) perylene-3,4:9,10-perylene bisimide, perylene-3,4,9,10-tetracarboxylic acid, 3,3'-(1,3,8,10-tetraoxo-1,3,8,10-tetrahydroanthra[2,1,9-def:6,5,10-d'e'f'] diisoquinoline-2,9-diyl) dibenzoic acid, and 5,5'-(1,3,8,10-tetraoxo-1,3,8,10-tetrahydroanthra[2,1,9-def:6,5,10-d'e'f'] diisoquinoline-2,9-diyl) diisophthallic acid.

The photocatalyst composition containing oligothiophenes as conjugated organic moiety are selected from [2,2':5",2"-terthiophene]-5-carboxylic acid or [2,2':5",2"-terthiophene]-5-5"-dicarboxylic acid.

The photocatalyst composition containing azo dyes as conjugated organic moiety wherein azo dye is (E)-4-((2-hydroxynaphthalen-1-yl) diazenyl) benzoic acid.

The present invention provides a photocatalyst composition optionally contain a co-catalyst is selected from the group consisting of Pt, Ag, NiO, alcohol, Glycerol and inorganic moieties which acts as scavenger.

The surface modification of ZnO nanoparticles is identified as a method of modulating surface sites advantageously. ZnO nanoparticles of two different sizes are surface modified with a conjugated organic moiety to enable electron conduction and transfer. Enhanced $H_2$ evolution from water methanol mixtures was observed in the composite systems compared to pristine ZnO under visible light irradiation without any co-catalyst. The system is also marginally active in water splitting in pure water without any sacrificial agents. Photophysical characterisation indicates that even though reducing size into nanoregime affects the band gap detrimentally, modifications by simple conjugated organic molecules assist in enhanced visible light activity. The experimental observations are corroborated with computational studies, which also point to a localization of valence band maximum of the interface on the organic moiety and conduction band minimum on ZnO.

The invention has double pronged advantage with this approach, (i) surface decoration of nanoparticles with organic ligands is known to reduce the defect sites and (ii) these organic moieties will be capable of absorbing and transferring electrons or holes preferentially away from the surface recombination sites depending on the band positions. Further, catalytic sites like metal nanoparticles or organometallic centres can also be linked to photogenerating semiconductor nanoparticles through these conducting organic moieties.

The present invention provides a process for the preparation of ZnO nanoparticles via precipitation method comprising:
a. refluxing KOH in methanol to obtain a refluxing KOH solution;
b. preparing Zn $(OAc)_2.2H_2O$ in methanol by stirring at room temperature in the range of 20 to 30° C. and adding the dissolved solution of zinc acetate into the refluxing KOH solution of step (a) with vigorous stirring to obtain the ZnO nanoparticles.

The present invention provides a process for the synthesis of conjugated organic moiety (azo dye) (E)-4-((2-hydroxynaphthalen-1-yl) diazenyl) benzoic acid (4ABBN) comprising:
a. adding distilled water and concentrated sulfuric acid to a solution of 4-amino benzoic acid and cooling to obtain a cold reaction mixture;
b. adding a solution of sodium nitrite in distilled water to the above cold mixture of step (a) with stirring to complete the diazotization and obtain the diazotized product;
c. adding β-naphthol very slowly with vigorous stirring to the diazotized product of step (b) to obtain the desired reddish orange coloured product precipitate.

The process for the synthesis of (E)-4-((2-hydroxynaphthalen-1-yl) diazenyl) benzoic acid (4ABBN) is shown in scheme 1.

The invention describes the strategy which involves surface grafting of ZnO nanoparticles with a conjugated organic linker to assist electron conduction. The activities of two ZnO nanoparticles with sizes ~3.5 and 35 nm surface modified with the conjugated molecule was compared. The enhanced activity of the smaller nanoparticles can be attributed to reduced bulk defects consequent to decrease in particles size which minimizes electron-hole recombination, even though effect of increased surface area cannot be ruled out. The conjugated organic linker, 4-((2-hydroxynaphthalen-1-yl) diazenyl) benzoic acid (4 ABBN) has also facilitated visible light absorption as shown by UV-vis spectroscopy. Such photocatalysts without the use of expensive dyes or co-catalysts may pave the way to a more efficient and cost effective method of $H_2$ generation.

The stability of the organic linker during reaction was tested by following the absorbance spectrum. Even though the absorbance intensity was found to decrease, this might not due to structural degradation of 4ABBN but some form of agglomeration and settling of the composite as observed by TEM. This was confirmed by continuous irradiation of the catalyst for longer durations; $H_2$ evolution after 8 and 12 h were found to be 152.9 mmol/g and 154 mmol/g for ZnOSG-4ABBN composite.

The detrimental effect of Pt on ZnO-4ABBN composites is also an interesting observation. The blocking of ZnO surface as well as to catalyzing undesired back reactions. This also shows that surface modification with 4ABBN has definitely enhanced the $H_2$ evolution ~20 fold. To test the role of methanol, measurements were done in water without adding methanol. $H_2$ evolution from pure water splitting was observed albeit to a small extent (1.23 mmol/g) for 4 h irradiation. This shows that methanol plays the role of enhancing the $H_2$ evolution. Methanol is known to assist in water splitting on semiconductor oxides by acting not only as a hole scavenger but also as electron enricher which enhances the hydrogen evolution. The radical formed after proton abstraction from $CH_3OH$ by the valence band hole injects one electron to the conduction band leading to the formation of formic acid and formaldehyde and eventually CO or $CO_2$. There is no presence of CO or $CO_2$ in detectable levels by gas chromatography. Presence of formic acid or formaldehyde, potential products in hole scavenging reactions of methanol, also was ruled out by liquid chromatography analysis of the reaction mixture.

Further, from computational studies it is clear that the photoexcitation occurs in the azo compound hence bringing up the possibility of HOMO of 4ABBN interacting with $CH_3OH$. This indicates that the utilization of methanol probably proceeds through a photochemical pathway involving HOMO of the azo compound rather than a simple current doubling mechanism involving valence band of ZnO and methanol contributes to $H_2$ production.

EXAMPLES

The following examples are given by way of illustration and therefore should not be construed to limit the scope of the invention.

Example 1: Preparation of ZnO Nanoparticles

A. By Precipitation Method

For smaller nanoparticles, precipitation method was followed. In a typical procedure, KOH (56 mM, 75 mL) in methanol was refluxed at 60° C. for 30 min. In another reaction mixture, $Zn(OAc)_2.2H_2O$ (56 mM, 25 mL) in methanol was prepared by stirring at room temperature (25° C.). The dissolved solution of zinc acetate was then added drop wise through an addition funnel into the refluxing KOH solution maintained at 60° C. with vigorous stirring. The formation of ZnONPs started immediately and the solution becomes clear.

B. By Sol Gel Method

Bigger ZnONPs were synthesized by sol gel method. Zinc acetate dihydrate (0.02389 mol) was treated with ethanol (144 mL) at 60° C. This was completely dissolved in about 30 min. Oxalic acid dihydrate (0.04878 mol) was dissolved in ethanol (98 mL) at 50° C. and was added slowly under stirring to the warm ethanolic solution of zinc acetate. A thick white gel formed, which was kept for drying at 80° C. for 20 h. The gel was calcined at 400° C. for 2 h to yield ZnONPs of size 20-40 nm.

Example 2: Preparation of Conjugated Organic Moiety

A. Synthesis of (E)-4-((2-hydroxynaphthalen-1-yl)diazenyl) benzoic acid (4ABBN)

To a solution of 4-amino benzoic acid (1.35 g, 0.009843 moles), distilled water (8.44 mL) and concentrated sulfuric acid (2.1 mL) was added drop wise. The mixture was cooled to 0° C. A solution of sodium nitrite (1.006 g, 0.01458 moles) in 3 mL of distilled water maintained at 0° C., was added to the above cold mixture drop wise with good stirring. After 20 min the diazotization was complete, which was verified by adding a solution of 4-(N,N-dimethylamine) benzaldehyde which generated colour if undiazotized aromatic amine is still present. To the diazotized product obtained, β-naphthol (2.012 g, 0.01395 moles) was added very slowly with vigorous stirring over 15 min. The reaction mixture was further stirred for 1 h and left to stand overnight (10 hr). A reddish orange coloured precipitate was observed which was purified by column chromatography. (Scheme 1).

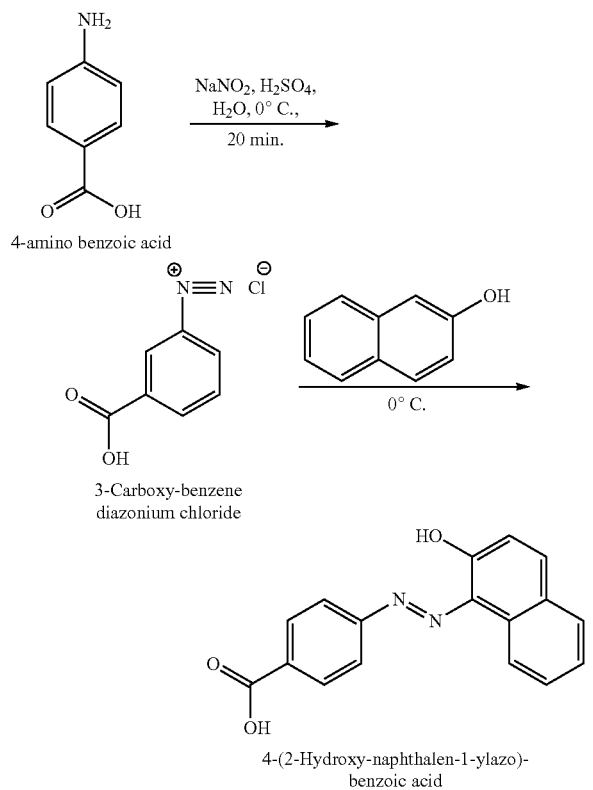 [SMILES: Nc1ccc(C(=O)O)cc1 ; [Cl-] ; N#[N+]c1cccc(C(=O)O)c1 ; Oc1ccc2ccccc2c1 ; O=C(O)c1ccc(/N=N/c2c(O)ccc3ccccc23)cc1]

B. Synthesis of Perylene-3,4,9,10-Tetracarboxylic Acid

A solution containing perylene-3,4,9,10-tetracarboxylic dianhydride (1.0 g, 0.254 mmol) and potassium hydroxide (1.0 g, 17.82 mmol) in water (15 mL) was heated with vigorous stirring at reflux. After 12 hours, the reaction mixture was cooled to room temperature. Acidification of the reaction mixture with 10% sulfuric acid (10 mL) yielded precipitation of product. The precipitate was collected by filtration, intensively washed with water and ethanol, and then dried in a vacuum to give perylene-3,4,9,10-tetracarboxylic acid (0.4 g,) as dark orange powders.

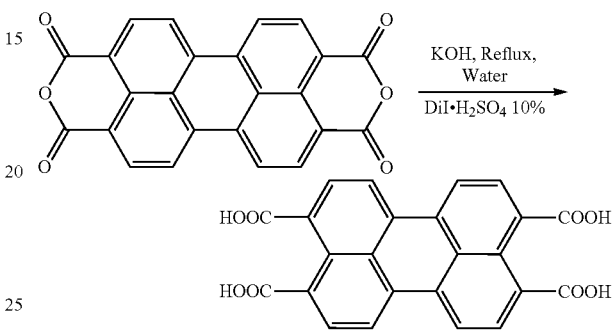

C. Synthesis of N,N'Bis(p-Carboxy-Phenylene) Perylene-3,4:9,10-Perylene Bisimide (PBI)

A mixture containing perylene-3,4,9,10-tetracarboxylic dianhydride (300 mg, 0.7 mmol) and imidazole (30 g) and 2 ml chloroform were stirred at 90° C. After sometime, about 255 mg (1.8 mmol) of p-aminobenzoic acid was added and the mixture was refluxed for 130° C. for 24 h followed by acidification and filtration. The precipitate was intensively washed with water and ethanol, and then dried in a vacuum to give PBI.

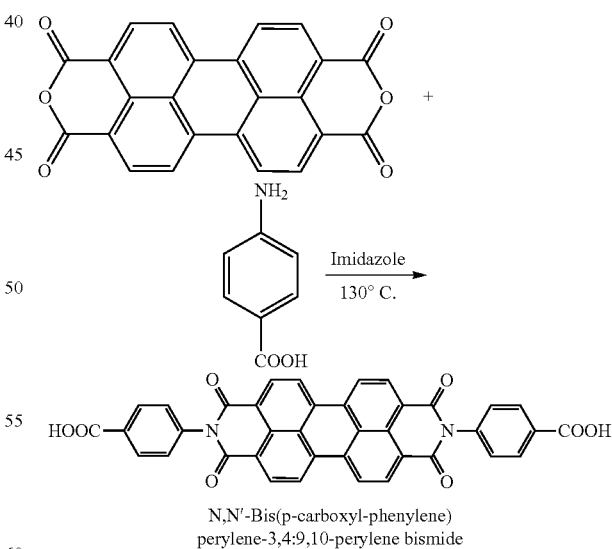

N,N'-Bis(p-carboxyl-phenylene) perylene-3,4:9,10-perylene bismide

D. Synthesis of 2,2':5',2"-Terthiophene

Mg (0.56 g, 23.3 mmol) was placed in 10 mL of dry ether then cooled to 0° C. 2-bromothiophene (2.9 mL, 30.3 mmol) was added dropwise for half h, and the reaction mixture was stirred also for another half hour. This solution was then transferred slowly via a cannula to a mixture of 2,5-dibromothiophene (1.3 mL, 11.6 mmol) and Ni(dppp)Cl₂ (305 mg, 0.466 mmol) in dry ether (50 mL) while cooling on ice. The reaction mixture was stirred for 16 h at room temperature and subsequently poured out in ice/water (150 mL) containing concentrated HCl (10 mL). The product was extracted with ether and the combined organic layers were washed with water and brine, successively. The organic extracts were dried over anhydrous MgSO₄, evaporated and purified with column chromatography to give slight yellowish solid 2.1 g (8.3 mmol, yield 71%).

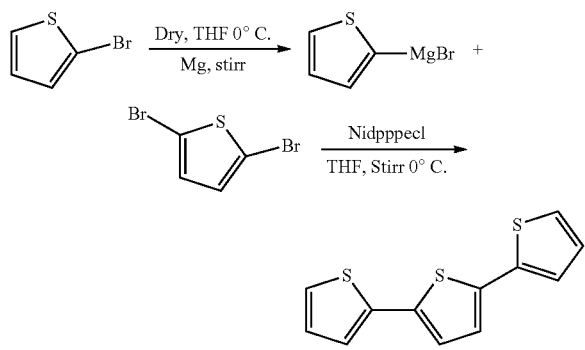

E. Synthesis of 2,2':5',2"-Terthiophene-5-Carboxylic Acid

To the synthesized 2,2':5',2"-Terthiophene, about 0.27 g of 5 formyl-2,2':5',2-terthiophene was dissolved in 50 ml of acetone and the temperature thereof was maintained at 15° C. CrO₃/H₂O/H₂SO₄ solution (0.9 g/12 ml/0.2 ml) was dropped in slowly and stirred for 4 hrs at 40° C. About 50 ml of water was added slowly, filtered and again washed with water and dried to obtain a yellowish solid.

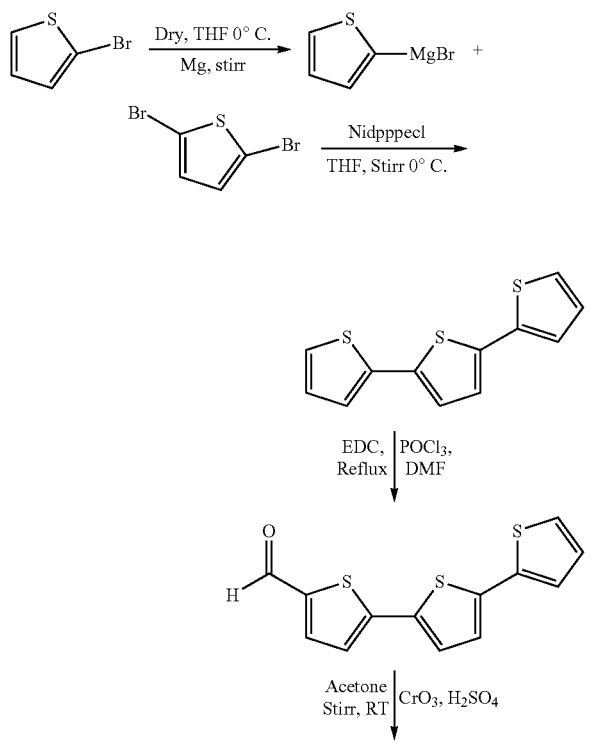

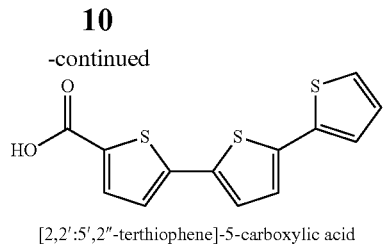

[2,2':5',2"-terthiophene]-5-carboxylic acid

Example 3: Preparation of Photocatalyst Composition No—4ABBN Composite 4-((2-hydroxynaphthalen-1-yl) diazenyl) benzoic acid (23 µmol) was added in-situ during the synthesis of ZnO by precipitation method (0.142 mmoles), to the alkaline zinc acetate solution. The solution was stirred in methanol at room temperature (27° C.) for 1 h. The product (ZnOPP-4ABBN) was washed with methanol, centrifuged and collected. Similarly, 0.38 mmoles of 4ABBN was added to ZnONPs synthesized by sol-gel method (10 mmoles). The solution was stirred in ethyl acetate at 27° C. for 3 h and the product (ZnOSG-4ABBN) was collected after the removal of excess solvent under vacuum. As control samples, 1 wt % Pt cocatalyst loaded pristine ZnO as well as ZnOPP-4ABBN and ZnOSG-4ABBN also were synthesized by wet impregnation. Typically, 51 mg of H₂PtCl₆.6H₂O was dissolved in minimum quantity of water and added to 198 mg of ZnO prepared by different methods, dried at 80° C. and finally calcined at 400° C. for 2 h. Appropriate amounts (4 wt %) of 4ABBN was added to the Pt loaded ZnO and stirred for 1 h, separated and dried.

Example 4: Experiment of Water Splitting

The catalysts were studied for their photocatalytic activity by reactions that were carried out in a gas-closed system with 45 mL of the dead volume. The photocatalyst powder (50 mg) was dispersed in a reactant solution (25 mL) by a magnetic stirrer in an irradiation cell made of quartz. 20 mL pure water and 5 mL methanol were employed as reactant solutions for water splitting. Here methanol was taken as sacrificial reagent which gets oxidized by the resulting photogenerated holes. The light source was 400 W mercury lamp for UV and 400 W Tungsten lamp for visible irradiation. The amount of H₂ evolved was determined using gas chromatography (Agilent GC with Carbosphere column and N₂ as carrier gas). The reaction was carried for 1 to 8 hours. The evolving gas mixture was taken in a syringe at an interval of 1 hour.

Example 5: Hydrogen Evolution Results

The ZnO Perylene composite/ZnO thiophene composite catalysts were studied for their photocatalytic activity by reactions carried out in a gas-closed system. These catalysts with their hydrogen evolution data are summarized in below table 1.

TABLE 1

| ZnO Perylene composite/ZnO thiophene composite | Hydrogen evolution |
|---|---|
| 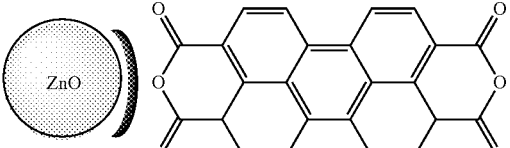 9,10-perylene tetracarboxylic dianhydride | 8 mmol/g |
| 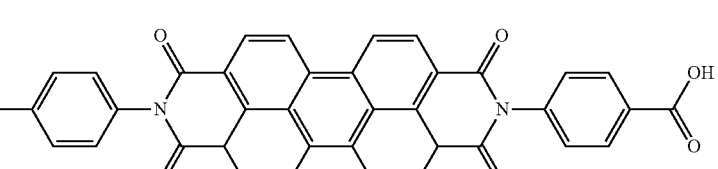 N,N'-Bis(p-carboxyl-phenylene)perylene-3,4:9,10-perylene bisimide | 16 mmol/g |
| 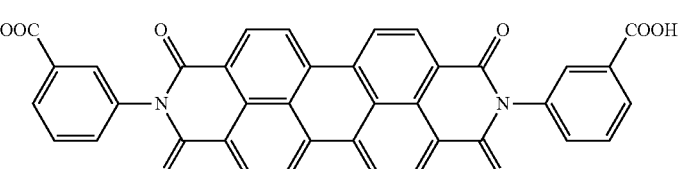 3,3'-(1,3,8,10-tetraoxo-1,3,8,10-tetrahydroanthra[2,1,9-def:6,5,10-d'e'f']diisoquinoline-2,9-diyl)dibenzoic acid | 12 mmol/g |
| 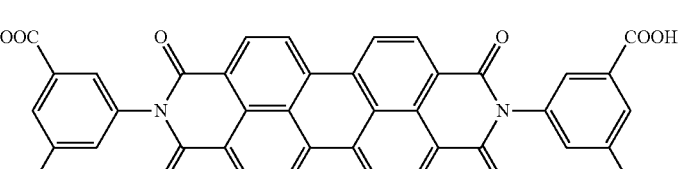 5,5'-(1,3,8,10-tetraoxo-1,3,8,10-tetrahydroanthra[2,1,9-def:6,5,10-d'e'f']diisoquinoline-2,9-diyl)diisophthalic acid | 4.37 mmol/g |
| 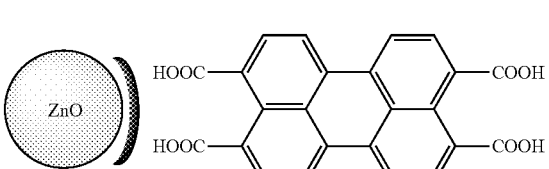 perylene-3,4,9,10-tetracarboxylic acid | 6.82 mmol/g |
| 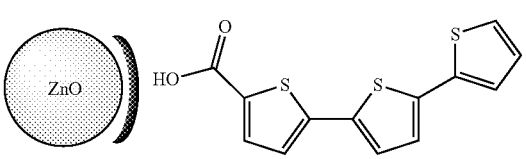 | 5 mmol/g |

TABLE 1-continued

| ZnO Perylene composite/ZnO thiophene composite | Hydrogen evolution |
|---|---|

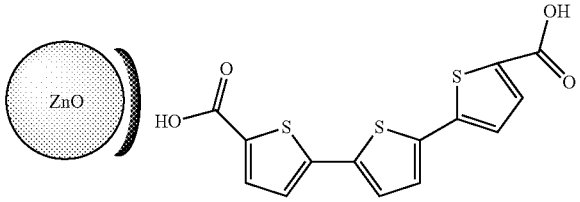 [SMILES: "ZnO" ; O=C(O)c1ccc(-c2ccc(-c3ccc(C(=O)O)s3)s2)s1]

[2,2',5',2''-terthiophene]-5-carboxylic acid 3.68 mmol/g

[2,2',5',2''-terthiophene]-5,5''-carboxylic acid

Experimental setup and conditions: Catalyst amount-25 mg, maintain RT, visible light, head space analysis after freezing the solution by gas chromatography.

Example 6: Characterization Studies of Catalyst

Figure 1:
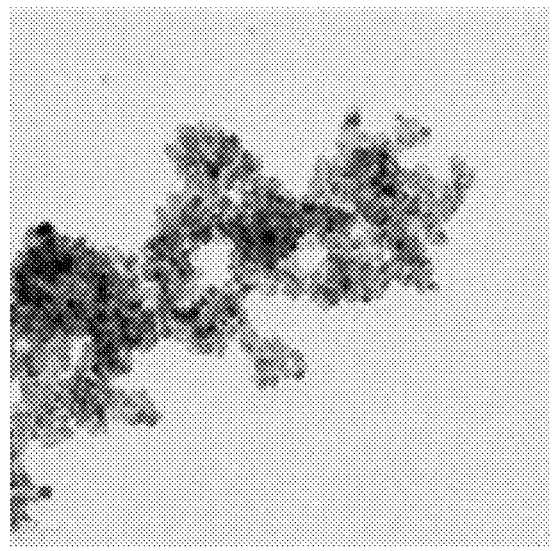
FIG. 1 depicts TEM images of (a) ZnONPs, (b) ZnO grafted with 4ABBN, (c) ZnO grafted with 3ABBN.
Figure 1:
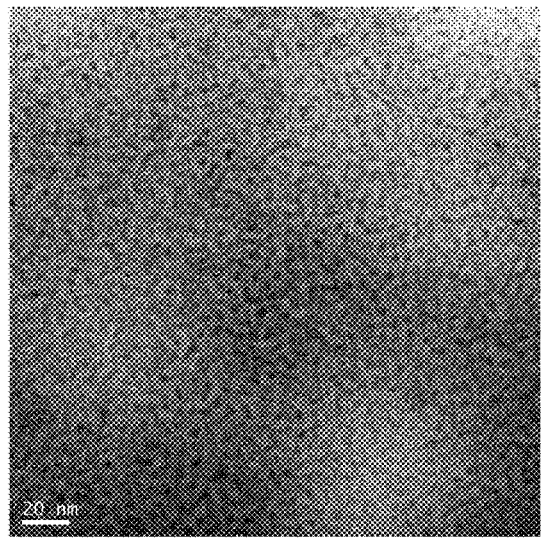
Figure 1:
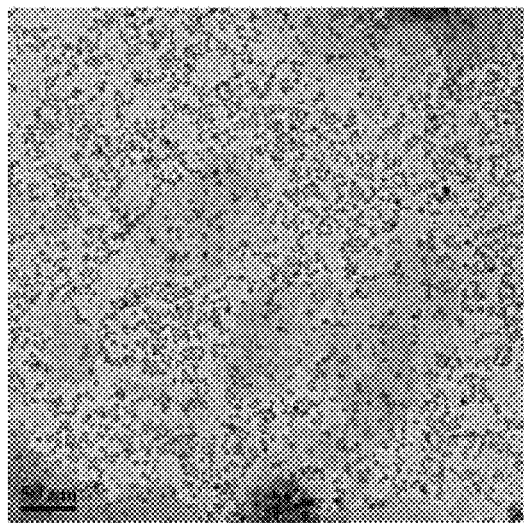

The size quantization of ZnO NPs can change the spectral positions of the defect and exciton emissions also. Photophysical characterizations of pristine ZnO NPs display slight variations as expected of the size differences (FIG. 1). The absorption onset shifted from 356 nm to 367 nm as the particle size increased from 10 to 35 nm. Also, as expected, the exciton emission was highly suppressed in both particles with an enhanced green defect emission. No substantial change in the defect emission spectral position was observed.

Figure 2:
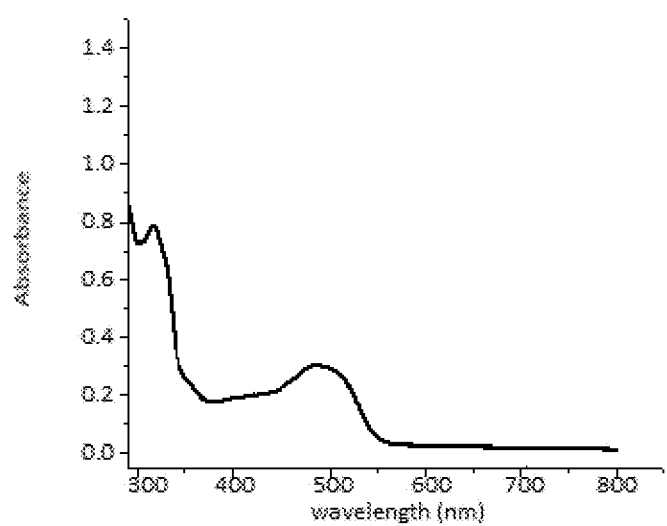
FIG. 2 depicts Absorption spectrum of ZnO-4ABBN composite (with 1:0.5 ratio based on surface ZnO).

These NPs were separately surface modified with 4ABBN. The amount of 4ABBN to be used was roughly estimated based on the number of ZnO on the surface of the particles. For smaller particles using precipitation method, the ligand 4ABBN was added in-situ before separating the solid product, whereas, in case of bigger particles, the ligand was grafted to dry powder samples. Powder X-ray diffraction patterns show that the parent wurtzite phase is not altered during the surface modification. Corresponding TEM images (FIG. 2) show spherical ZnO nanoparticles, with fairly uniform size with mean diameter of 3.5±1.5 nm (by precipitation method) and 35±15 nm (by sol-gel method). The surface modification of ZnO (size ~10 nm in pristine form) has assisted in reducing the agglomeration effect seen in naked ZnO. Also, surface modification appears to have decreased the ZnO particle size (3.5±1.5 nm) because of arrest of solution ripening possible for naked ZnO as a consequence of in-situ addition of the organic ligand.

Figure 3:
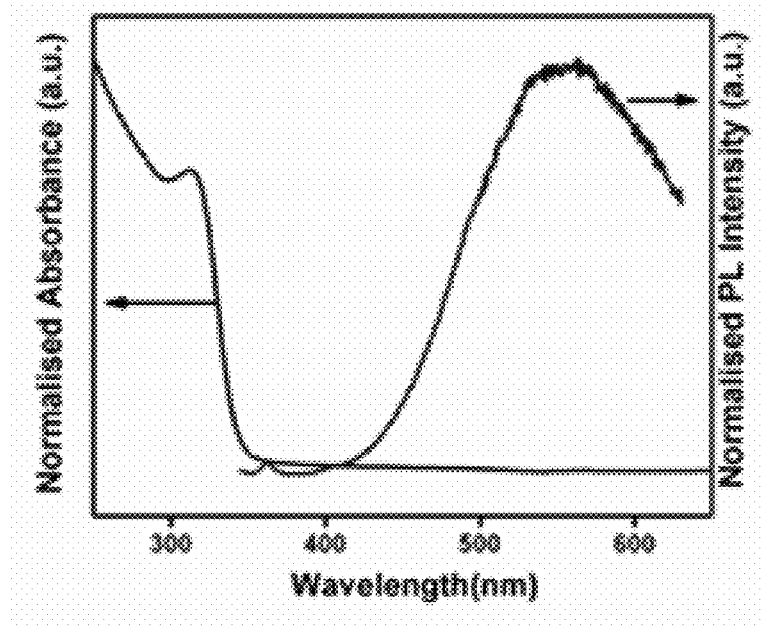
FIG. 3 depicts UV-vis spectrum and photoluminescence spectrum at excitation wavelength of 325 nm of pristine ZnO NPs of sizes 10+2 nm (left) and 35+15 nm (right).
Figure 3:
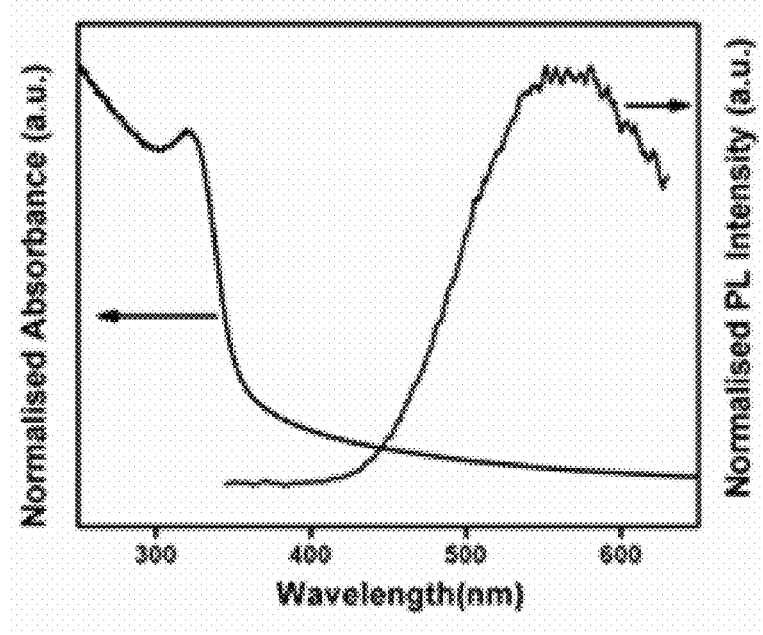
Figure 4:
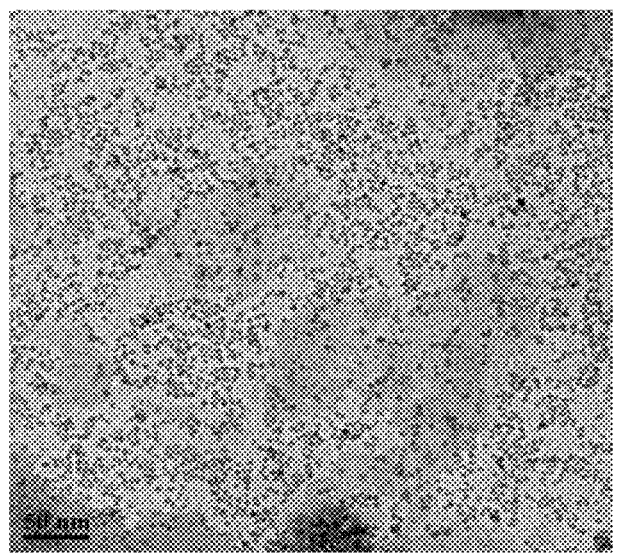
FIG. 4 depicts TEM images of ZnO-4ABBN composites of sizes 3.5+1.5 nm (top) and 35+15 nm (bottom).
Figure 4:
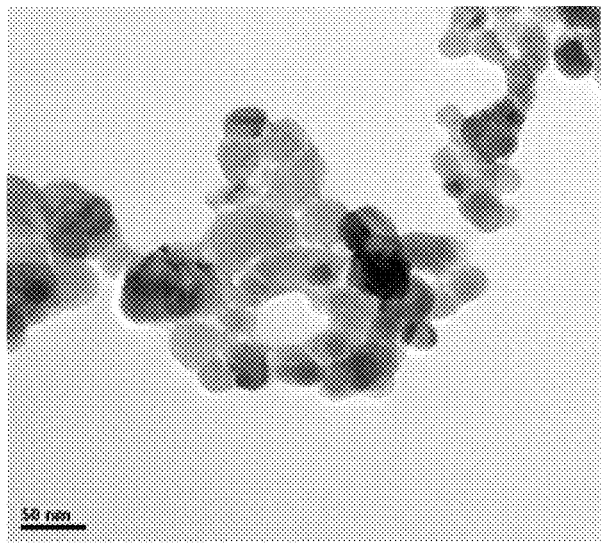
Figure 5:
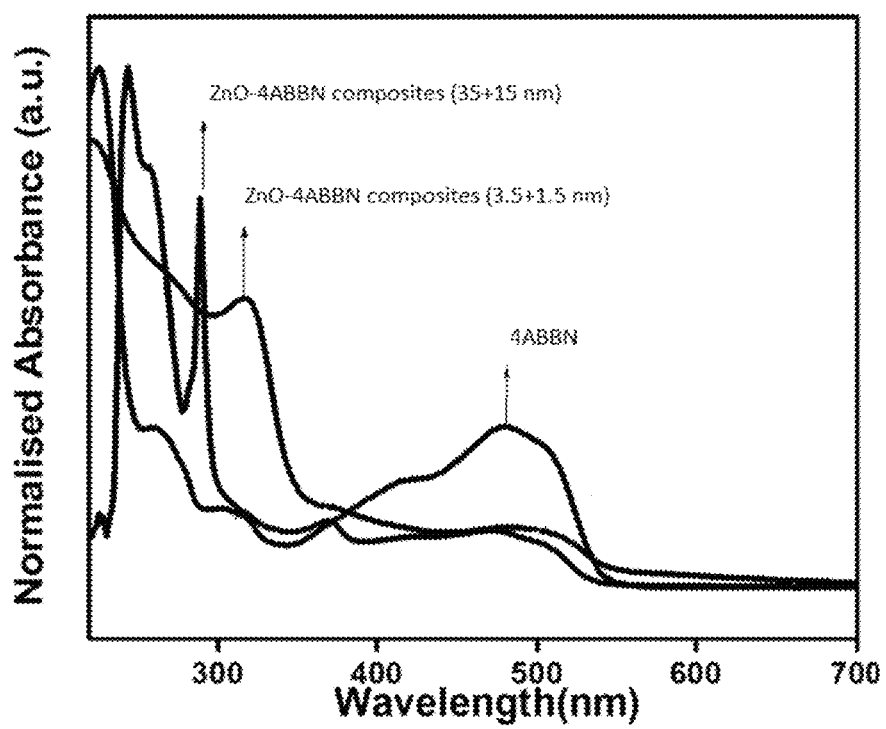
FIG. 5 depicts UV-vis spectrum (top) and photoluminescence spectrum at excitation wavelength of 260 nm (bottom) of 4ABBN and ZnO-4ABBN composites for sizes of 3.5+1.5 nm and 35+15 nm. The spikes observed are due to excitation overtone at 2λ.
Figure 5:
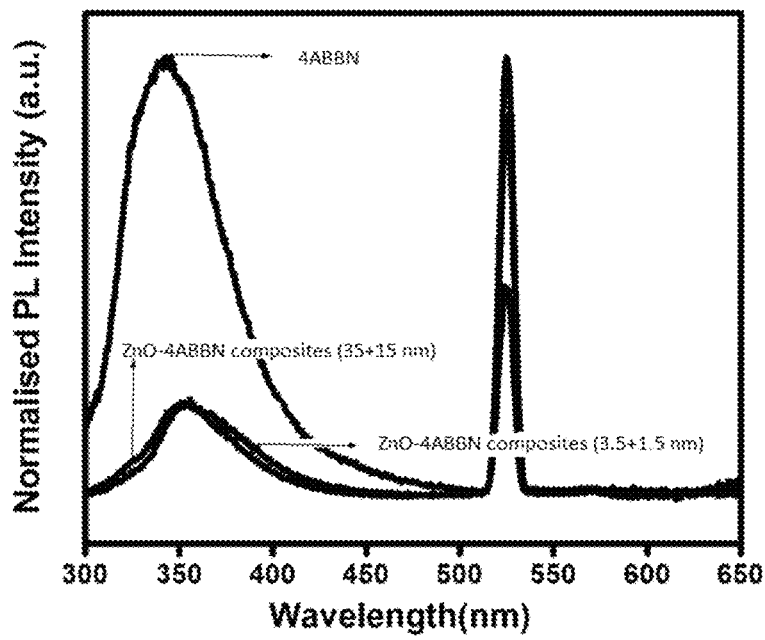

UV-vis absorption studies were carried out on 4ABBN as well as ZnO-4ABBN composite and compared with pristine ZnO (FIG. 3). 4ABBN is found to have sharp absorptions at 310 and 480 nm. Shoulder peaks around, 410 and 505 nm are also observed. The absorbance spectrum of the ZnO-azo composite system showed combined features of ZnO and dye with well-defined absorption peaks at 315 and 495 nm with some shoulder absorption peaks around 225, 270 and 370 nm. Considering the absorption edge at 325 nm as the band gap absorption, a slight blue shift is observed which may be attributed to a reduction in size observed after grafting. However, the composite showed visible light absorption contributed by the organic linker.

PL studies also prove surface modification in which the green emission is suppressed. This evidences a modification of the surface sites thereby minimizing the trap sites for recombination. Fluorescence emission of 4ABBN in the UV region has also helped in enhancing the band gap emission of the composite. These characterizations indicate that even though trap sites, which may act as electron sinks, are minimized in the composites, some new energy levels in appropriate positions are created. These allow visible light absorption and an electron transfer probably from the organic linker to ZnO.

The FIG. 6 shows $H_2$ evolution under same conditions measured for pristine ZnO NPs (both 10±2 nm and 35±15 nm) modified with Pt as well as ZnO-4ABBN composites (both ZnOPP-4ABBN and ZnOSG-4ABBN) modified with Pt. Interestingly, both displayed lesser activities than ZnO-4ABBN composites without Pt; $H_2$ evolution of Pt/ZnO was 1.7 mmol/g for 10±2 nm and 4.4 mmol/g for 35±15 nm and that of Pt/ZnO-4ABBN was 7.2 mmol/g for 3.5±1.5 nm and 9.2 mmol/g for 35±15 nm. There is enhanced (5 fold) $H_2$ evolution from ultra small nanoparticles (~3.5 nm) of ZnO surface modified with the organic molecule when compared to bigger surface modified ZnO NPs is observed.

Advantages of Invention a. Provides surface functionalized catalyst.
b. Minimizes bulk recombination sites using semiconductor nanoparticles and spatial separation.
c. Reduces surface sites using conducting organic linkers.
d. It can have applications related to dye sensitized solar cells.

We claim:

1. A process for the preparation of a photocatalyst composition, wherein said process comprises:
   (i). refluxing KOH in methanol at 60° C. for 30 minutes to obtain a refluxed KOH solution, adding, drop wise, a dissolved solution of zinc acetate, prepared by adding $Zn(OAc)_2.2H_2O$ in methanol with stirring at a room temperature of 25° C., to the refluxed KOH solution maintained at 60° C. to obtain an alkaline zinc acetate solution; and
   (ii). Oil in-situ adding a conjugated organic moiety to the alkaline zinc acetate solution of (i) to obtain the photocatalyst composition, the photocatalyst composition consisting of:
      95-97 wt % zinc oxide nanoparticles;
      2-4 wt % conjugated organic moiety; and
      1 wt % co-catalyst,
         wherein the conjugated organic moiety is a perylene.

2. The process for the preparation of the photocatalyst composition according to claim 1, wherein the composition is photoactive in visible light.

3. The process for the preparation of the photocatalyst composition according to claim 1, wherein the co-catalyst is selected from the group consisting of platinum, silver, and nickel (II) oxide.

4. The process for the preparation of the photocatalyst composition according to claim 1, wherein the perylene is selected from the group consisting of 9,10 perylenetetracarboxylic acid, N,N'-bis(p-carboxyl-phenylene) perylene-3,4:9,10-perylene bisimide, perylene-3,4,9,10-tetracarboxylic acid, 3,3'-(1,3,8,10-tetraoxo-1,3,8,10-tetrahydroanthra[2,1,9-def:6,5,10-d'e'f']diisoquinoline-2,9-diyl) dibenzoic acid, and 5,5'-(1,3,8,10-tetraoxo-1,3,8,10-tetrahydroanthra[2,1,9-def:6,5,10-d'e'f']diisoquinoline-2,9-diyl) diisophthallic acid.

* * * * *